United States Patent
Pemmi et al.

(10) Patent No.: US 8,631,660 B2
(45) Date of Patent: Jan. 21, 2014

(54) INTEGRATED GASIFICATION COMBINED CYCLE SYSTEM WITH VAPOR ABSORPTION CHILLING

(75) Inventors: Bhaskar Pemmi, Bangalore Karnataka (IN); Anil Kumar Sharma, Bangalore Karnataka (IN); Rajarshi Saha, Bangalore Karnataka (IN); Indrajit Mazumder, Bangalore Karnataka (IN); Qiong Zhou, Houston, TX (US); Christopher Michael Robbins, Houston, TX (US); Paul Roberts Scarboro, Houston, TX (US); Ann Verwilst Driscoll, Greenville, SC (US)

(73) Assignee: General Electric Company, Schenectady, NY (US)

( * ) Notice: Subject to any disclaimer, the term of this patent is extended or adjusted under 35 U.S.C. 154(b) by 380 days.

(21) Appl. No.: 13/069,456

(22) Filed: Mar. 23, 2011

(65) Prior Publication Data

US 2012/0240603 A1   Sep. 27, 2012

(51) Int. Cl.
   *F25B 7/00*   (2006.01)
(52) U.S. Cl.
   USPC ............................. 62/79; 62/238.3
(58) Field of Classification Search
   USPC ............. 62/238.3, 238.4, 79, 62, 331, 476; 60/39.52, 39.511, 728
   See application file for complete search history.

(56) References Cited

U.S. PATENT DOCUMENTS

| | | | | |
|---|---|---|---|---|
| 4,053,507 A | * | 10/1977 | Inoue et al. | 564/71 |
| 4,936,109 A | | 6/1990 | Longardner | |
| 5,025,631 A | * | 6/1991 | Garbo | 60/655 |
| 5,203,161 A | * | 4/1993 | Lehto | 60/39.53 |
| 5,992,512 A | * | 11/1999 | Tsuri et al. | 165/133 |
| 6,073,454 A | | 6/2000 | Spauschus et al. | |
| 6,155,039 A | * | 12/2000 | Agee et al. | 60/780 |
| 6,170,263 B1 | | 1/2001 | Chow et al. | |
| 6,374,630 B1 | | 4/2002 | Jones | |
| 6,550,272 B2 | * | 4/2003 | Nakajima et al. | 62/476 |
| 6,739,119 B2 | * | 5/2004 | Erickson | 60/39.53 |
| 6,745,574 B1 | * | 6/2004 | Dettmer | 60/784 |
| 6,817,210 B1 | * | 11/2004 | Kim et al. | 62/497 |
| 6,883,327 B2 | * | 4/2005 | Iijima et al. | 60/649 |
| 7,178,348 B2 | | 2/2007 | Stuhlmueller | |
| 7,472,550 B2 | * | 1/2009 | Lear et al. | 60/728 |
| 7,961,835 B2 | * | 6/2011 | Keller | 376/317 |

OTHER PUBLICATIONS

U.S. Appl. No. 12/613,592, filed Jun. 11, 2009, Steele, et al.
U.S. Appl. No. 12/831,183, filed Jul. 6, 2010, Ravikumar, et al.

* cited by examiner

*Primary Examiner* — Mohammad M Ali
(74) *Attorney, Agent, or Firm* — Sutherland Asbill & Brennan LLP

(57) ABSTRACT

The present application and the resultant patent provide an integrated gasification combined cycle system. The integrated gasification combined cycle system may include a gas turbine engine, one or more power plant components, one or more carbon dioxide compressors, and a vapor absorption chiller. The vapor absorption chiller is driven by a waste heat source flow from the carbon dioxide compressors to produce a chilling medium flow to cool the power plant components.

20 Claims, 4 Drawing Sheets

INTEGRATED GASIFICATION COMBINED CYCLE SYSTEM WITH VAPOR ABSORPTION CHILLING

TECHNICAL FIELD

The present application relates generally to integrated gasification combined cycle systems and more particularly relates to an integrated gasification combined cycle system using vapor absorption chilling driven by the waste heat of a gas compression system.

BACKGROUND OF THE INVENTION

Generally described, carbon dioxide ("$CO_2$") produced in power generation facilities is considered to be a greenhouse gas. As such, the carbon dioxide produced in the overall power production process generally is sequestered and then recycled for other purposes or otherwise disposed. In current integrated gasification combined cycle ("IGCC") systems, the pre-combustion capture of carbon dioxide is preferred. Once captured, the carbon dioxide generally may be compressed before transport, disposal, or other use. Specifically, various integrated gasification combined cycle system designs require the compression of the carbon dioxide before the gas is recycled to, for example, the feed system, the gasifier, or other locations in the overall system.

The net power output from an integrated gasification combined cycle system or other type of power plant is determined by the output of the gas turbine engine(s) operating on a syngas or other fuel. Any parasitical electrical or other type of load in the power plant serves to reduce the net generation output. The compression of carbon dioxide, however, generally requires large amounts of auxiliary compression power. This compression power usually is provided by electric drives or steam turbines. This type of parasitic load thus results in lower overall power plant net output and efficiency. Moreover, the use of cooling tower water to cool the carbon dioxide compressors may be expensive and impractical in areas where water may be expensive and/or rare.

There is thus a desire for improved integrated gasification combined cycle systems. Such improved integrated gasification combined cycle systems may limit the parasitic load caused by compressing and cooling of carbon dioxide so as to increase net power generation output and efficiency while maintaining the ecological benefits of carbon dioxide sequestration.

SUMMARY OF THE INVENTION

The present application and the resultant patent thus provide an integrated gasification combined cycle system. The integrated gasification combined cycle system may include a gas turbine engine, one or more power plant components, one or more carbon dioxide compressors, and a vapor absorption chiller. The vapor absorption chiller is driven by a waste heat source flow from the carbon dioxide compressors to produce a chilling medium flow to cool the power plant components.

The present application and the resultant patent further provide a method of cooling a power plant component. The method may include the steps of generating a waste heat source flow in one or more carbon dioxide compressors, driving a vapor absorption chiller with the waste heat source flow, generating a chilling medium flow in the vapor absorption chiller, and cooling the power plant component with the chilling medium flow. The method further may include the steps of vaporizing a refrigerant in a generator of the vapor absorption chiller, liquefying the refrigerant in a condenser, expanding the refrigerant in an evaporator, reabsorbing the refrigerant in an absorber, and repeating the cycle.

The present application and the resultant patent further may provide an integrated gasification combined cycle system. The integrated gasification combined cycle system may include one or more carbon dioxide compressors, one or more compressor coolers, and a vapor absorption chiller. The vapor absorption chiller is driven by a waste heat source flow from the carbon dioxide compressors to produce a chilling medium flow to cool the compressor coolers.

These and other features and improvements of the present application will become apparent to one of ordinary skill in the art upon review of the following detailed description when taken in conjunction with the several drawings and the appended claims.

DETAILED DESCRIPTION

Figure 1:
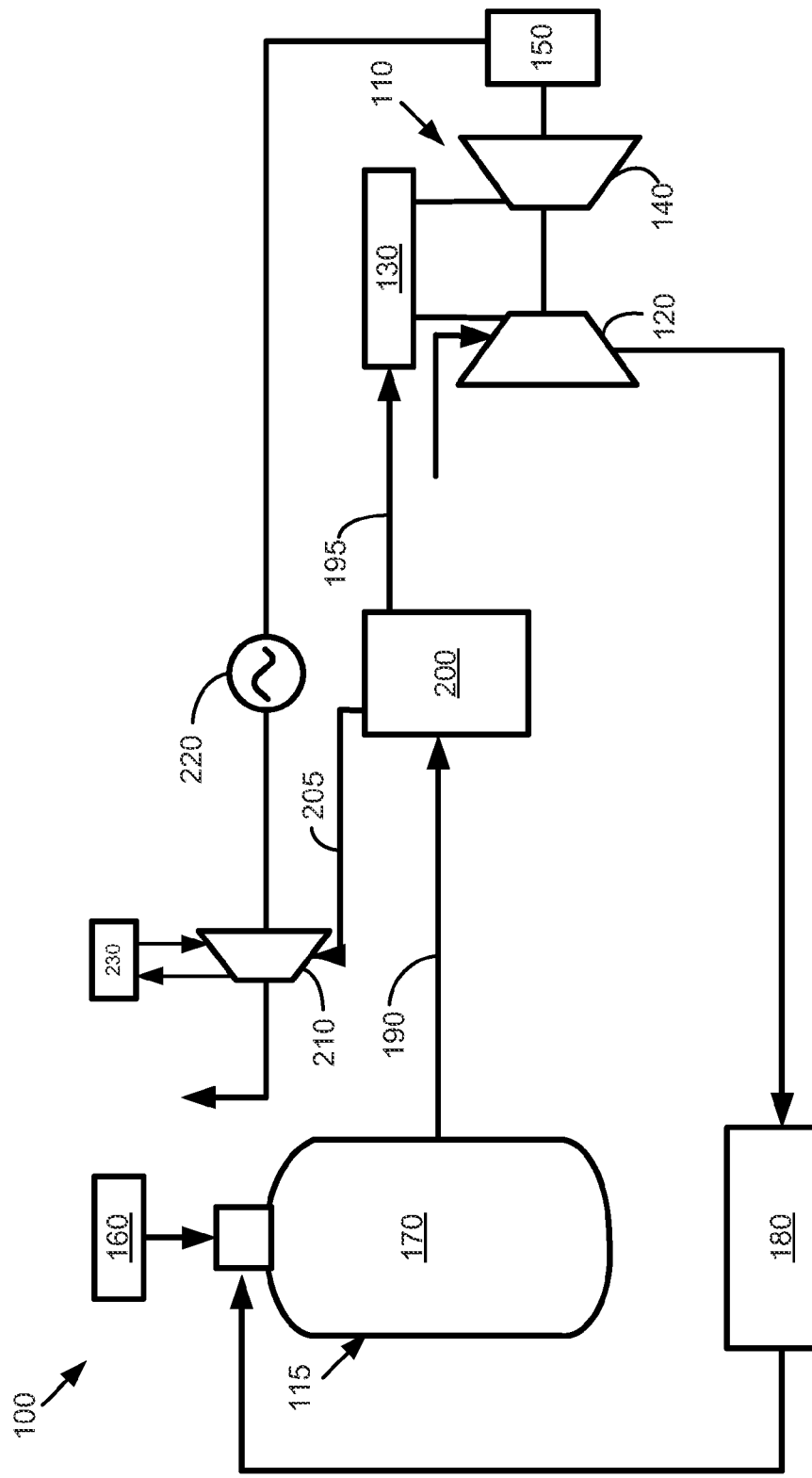
FIG. 1 is a schematic view of a portion of an integrated gasification combined cycle system.

Referring now to the drawings, in which like numerals refer to like elements throughout the several views, FIG. 1 shows a schematic view of a known integrated gasification combined cycle system 100. Only those elements related to the subject matter described herein are shown for purposes of simplification. The overall integrated gasification combined cycle system 100 may have many other configurations and may use many other types of equipment.

The integrated gasification combined cycle system 100 may include one or more gas turbine engines 110. As is known, the gas turbine engine 110 may include a compressor 120 to compress an incoming flow of air. The compressor 120 delivers the compressed flow of air to a combustor 130. The combustor 130 mixes the compressed flow of air with a compressed flow of fuel and ignites the mixture. Although only a single combustor 130 is shown, the gas turbine engine 110 may include any number of combustors 130. The hot combustion gases are in turn delivered to a turbine 140. The hot combustion gases drive the turbine 140 so as to produce mechanical work. The mechanical work produced in the turbine 140 drives the compressor 120 and an external load 150 such as an electrical generator and the like. The gas turbine engine 110 may have many other configurations and may use many other types of equipment. The integrated gasification combined cycle system 100 may have multiple gas turbine engines 110.

The gas turbine engine 110 may use natural gas, various types of syngas, combinations thereof, and other types of fuels. The syngas may be derived from a syngas production system 115. The syngas production system 115 may produce the syngas from a source of coal 160 according to several known techniques. In this example, the coal may be delivered to a gasifier 170. The gasifier 170 mixes the coal from the coal source 160 with oxygen from an air separation unit 180 or other source to produce a syngas 190 via a partial oxidation process or otherwise. The air separation unit 180 may receive extraction air from the compressor 120 or other source. Other types of gasification techniques and other sources of syngas may be used herein.

The raw syngas 190 from the gasifier 170 then may be sent to an acid gas removal system 200. The acid gas removal system 200 removes a flow of carbon dioxide 205, hydrogen sulfide ($H_2S$), and other gases from the syngas 190. The acid gases may be removed via a catalytic process, a solvent, and other known techniques. The now clean syngas 195 then may be forwarded to the combustor 130 of the gas turbine engine 110 for combustion in the manner described above or otherwise.

The syngas production system 115 also may include one or more carbon dioxide compressor 210 to compress the flow of carbon dioxide 205 produced by the acid gas removal system 200 or otherwise. As described above, the flow of carbon dioxide 205 generally is required to be compressed before being sequestered, recycled, or otherwise disposed. The carbon dioxide compressors 210 may be of conventional design. The carbon dioxide compressors 210 may be driven in this example by an electrical motor 220, a steam turbine, or other types of drive devices. The electrical motor 220 or other type of drive device may be of conventional design. The electrical motor 220 may be considered a parasitic load on the overall integrated gasification combined cycle system 100 in that the motor 220 reduces the gross power generation therein. The carbon dioxide compressors 210 may be water cooled and in communication with a cooling tower 230 or other source of a cooling medium. Other configurations and other components may be used herein.

A number of other steps may be used between the gasifier 170 and the acid gas removal system 200 and in the overall integrated gasification combined cycle system 100. For example, particulate scrubbing, cooling, hydrolysis, water gas shifting, mercury removal, and other steps may be used herein. Likewise, clean syngas heating and moisture addition may take place between the acid gas removal system 200 and the gas turbine engine 110 or otherwise. Many other steps, devices, and processes may be used herein.

Figure 2:
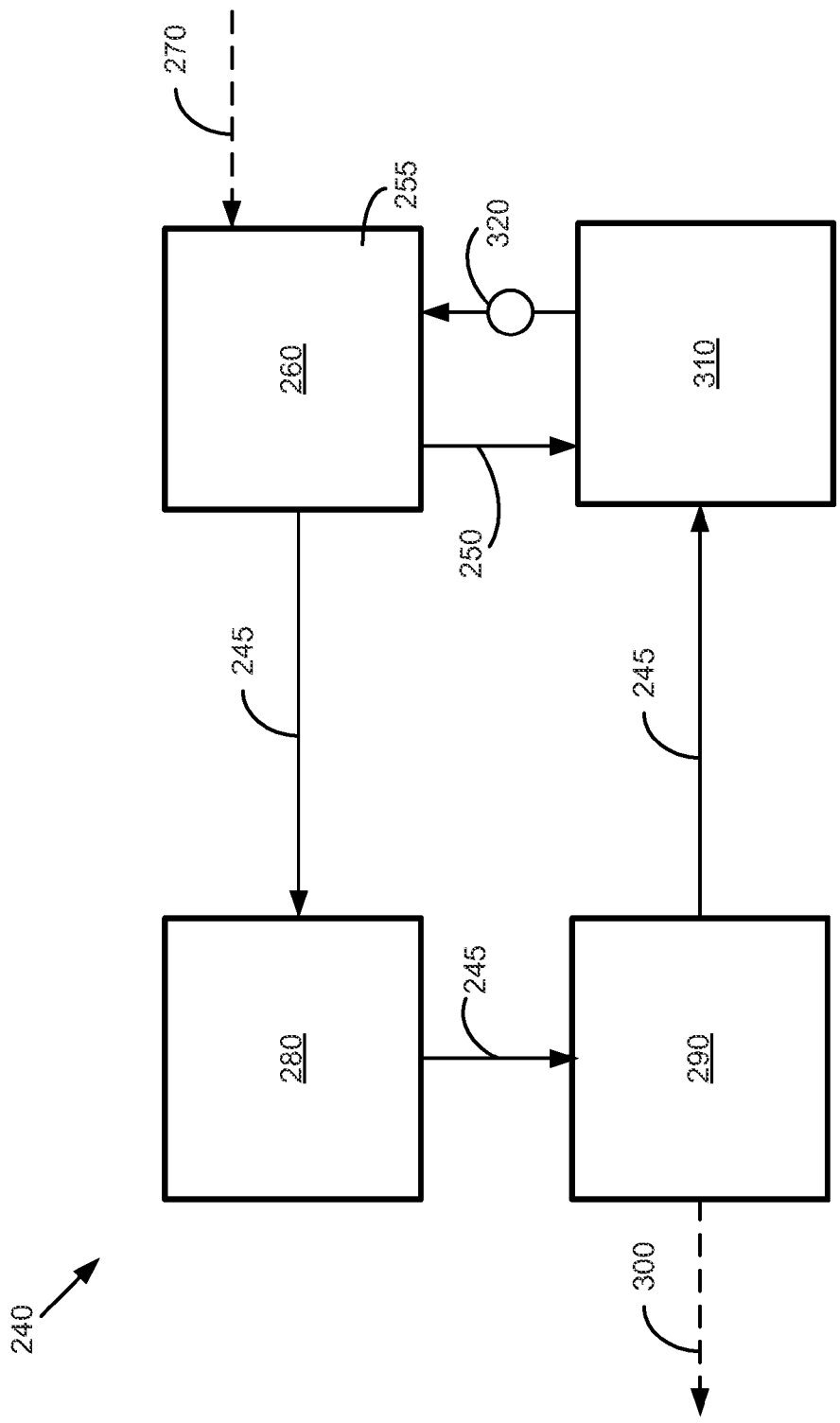
FIG. 2 is a schematic view of an example of a vapor absorption chiller as may be used herein.

FIG. 2 shows an example of a vapor absorption chiller 240 as may be used herein. Generally described, the vapor absorption chiller 240 creates refrigeration by absorbing and releasing a refrigerant 245 from an absorbent 250 in a refrigerant solution 255. Specifically, the refrigerant 245 in the refrigerant solution 255 may be vaporized in a generator 260 in communication with a waste heat source flow 270. The vapor refrigerant 245 then may be liquefied in a condenser 280 and flow to an evaporator 290. The refrigerant 245 may expand in the evaporator 290 and cool below atmospheric temperature. The now cool refrigerant 245 may exchange heat with a chilling medium flow 300 in the evaporator 290. The refrigerant 245 again may vaporize in the evaporator 290 and pass to an absorber 310. The refrigerant vapor 245 then may be reabsorbed into the absorbent 250 in the absorber 310. The now refrigerant rich refrigerant solution 255 may be returned to the generator 260 via a pump 320 or other type of mechanical fluid device so as to repeat the cycle. Other configurations and other components may be used herein.

Figure 3:
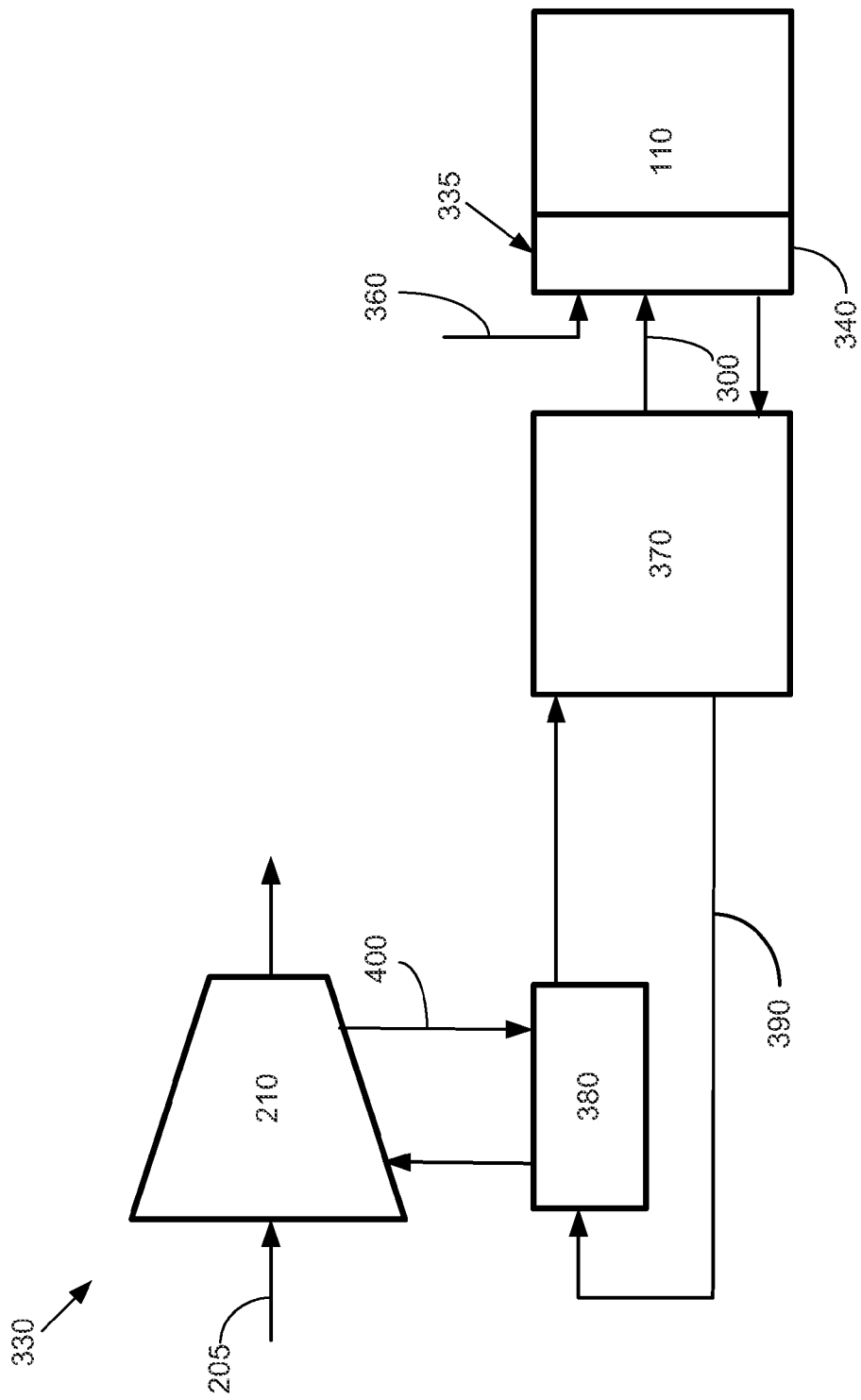
FIG. 3 is a schematic view of a portion of an integrated gasification combined cycle system using a vapor absorption chiller for inlet chilling as may be described herein.

FIG. 3 shows a portion of an integrated gasification combined cycle system 330 as may be used herein. As described above, the integrated gasification combined cycle system 330 may include the gas turbine engine 110, the carbon dioxide compressor 210, and similar types of devices. In this example, the gas turbine engine 110 may have a power plant component 335 positioned thereabout. In this example, the power plant component 335 may be a turbine inlet chiller 340. The turbine inlet chiller 340 may be any type of heat exchange device so as to chill an incoming flow of air 360 into the components of the gas turbine engine 110. The turbine inlet chiller 340 may be of conventional design. As will be described in more detail below, the power plant component 335 may be any device in the overall integrated gasification combined cycle system 330 that requires a cooling flow.

The integrated gasification combined cycle system 330 also may use a vapor absorption chiller 370. The vapor absorption chiller 370 may be similar to that described above. The vapor absorption chiller 370 may be in communication with and cools the carbon dioxide compressor 210 via a compressor heat exchanger 380. The vapor absorption chiller 370 may be in communication with the compressor heat exchanger 380 in a first fluid circuit 390 while the carbon dioxide compressor 210 and the compressor heat exchanger 380 may be in communication via a second fluid circuit 400. Other components and other configurations may be used herein.

Waste heat generated in the carbon dioxide compressor 210 may be absorbed in the second fluid circuit 400. The second fluid circuit 400 then may be cooled in the compressor heat exchanger 380 with the first fluid circuit 390. The heat absorbed by the first fluid circuit 390 acts as the waste heat source flow 270 in communication with the generator 260 of the vapor absorption chiller 370. After exchanging heat in the generator 260, the now cooled first fluid circuit 390 then may return to the compressor heat exchanger 380 and repeat the cooling cycle. As such, the carbon dioxide compressor 210 may be cooled in a closed loop system not requiring the use of a cooling tower. Likewise, the waste heat produced by the carbon dioxide compressor 210 feeds the generator 260 of the vapor absorption chiller 370 in a closed loop system with the compressor heat exchanger 380.

In turn, the chilling medium flow 300 cooled by the evaporator 290 of the vapor absorption chiller 370 may be directed to the turbine inlet air chiller 340 to chill the incoming flow of air 360. Chilling the incoming flow of air 360 should improve overall gas turbine engine output, particularly on warmer days. The operation of the turbine inlet air chiller 340 thus is provided by the waste heat source flow 270 of the carbon dioxide compressor 210 that would otherwise not provide useful work. Moreover, the use of the waste heat source flow 270 may provide an overall reduction in parasitic power loses.

Although the operation of the turbine inlet chiller 340 was described herein, the chilling medium flow 300 produced by the vapor absorption chiller 370 also may be used with any power plant component 335 for any purpose. For example, inlet and inter-stage cooling, lube oil cooling, syngas cooling, air separation unit cooling, on-base cooling, condenser cooling water cooling, and many other purposes. As above, the cooling provided herein is "free" in that it does not increase the overall parasitic power loses.

Figure 4:
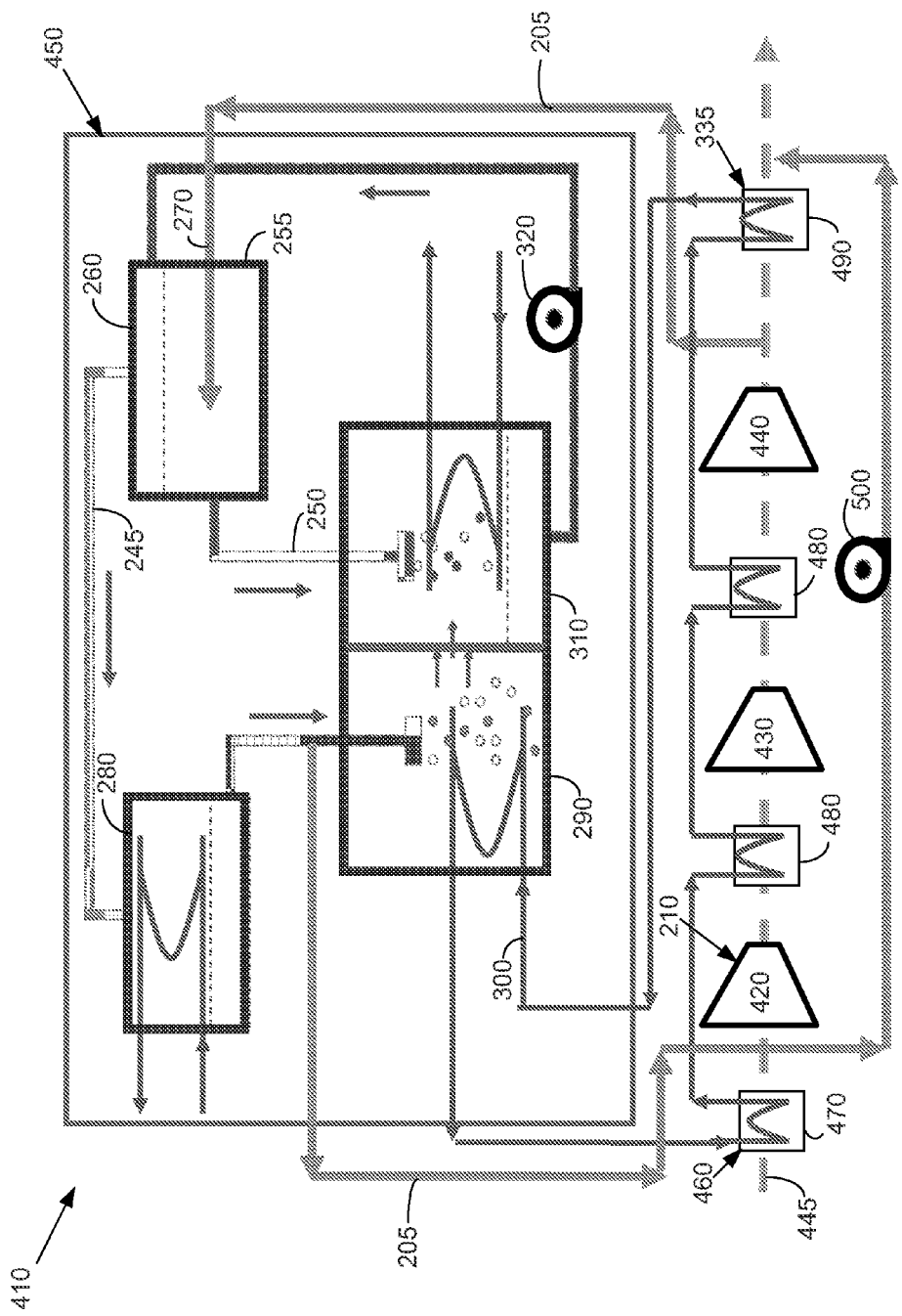
FIG. 4 is a schematic view of a portion of an integrated gasification combined cycle system using a vapor absorption chiller for cooling carbon dioxide compressors as may be described herein.

FIG. 4 shows a further example of an integrated gasification combined cycle system 410 as may be described herein. The integrated gasification combined cycle system 410 also includes a number of the carbon dioxide compressors 210. In this example, a low pressure compressor 420, an intermediate pressure compressor 430, and a high pressure compressor 440 may be used. Any number of carbon dioxide compressors 210 may be used herein. The carbon dioxide compressors 210 may compress a portion 445 the flow of carbon dioxide 205 to a supercritical state so as to liquefy the flow for transport and the like.

The integrated gasification combined cycle system 410 also includes a vapor absorption chiller 450. The vapor absorption chiller 450 may be similar to that described above. The integrated combined cycle system 410 uses the chilling medium flow 300 produced by the evaporator 290 to cool the carbon dioxide compressors 210 via a number of compressor coolers 460. In this example, a pre-cooler 470, a number of inter-coolers 480, and an after-cooler 490 may be used herein. Any number of compressor coolers 460 may be used herein.

In this example, the flow of carbon dioxide 205 is used as both the waste heat source flow 270 and the refrigerant 245 in the generator 260. The absorbent 250 may be an alcohol, an ether, and the like. The flow of carbon dioxide 205 may be vaporized in the generator 260 and flow to the condenser 280 in a super-critical state. The carbon dioxide 205 then may be liquefied in the condenser 280 and flow to the evaporator 290. The flow of carbon dioxide 205 may be expanded therein so as to provide cooling. Specifically, the flow of carbon dioxide 205 exchanges heat with the chilling medium flow 300. The chilling medium flow 300 may be returned to the compressor coolers 460 for cooling therein. The flow of carbon dioxide 205 then may be returned to the absorber 310 for further cycling.

Unlike in a common vapor absorption cycle, the flow of carbon dioxide 205 at high temperature may be directly injected into the absorbent 250. The same amount of the liquid carbon dioxide 205 may be taken out from the cycle before the evaporator 290 as was added to the cycle in the generator 260. The recovered carbon dioxide 205 may be put back into the compression process via a pump 500 or other type of fluid device.

The integrated combined cycle system 410 thus uses the waste heat produced by the carbon dioxide compressors 210 and the flow of carbon dioxide 205 itself to drive the vapor absorption chiller 450. In turn, the vapor absorption chiller 450 produces the chilling medium flow 300 to cool the carbon dioxide compressors 210 via the compressor coolers 460. The compressor coolers 460 thus may be considered the power plant component 335 herein.

The chilling medium flow 300 used herein is more efficient than those produced by typical cooling towers and the like. As such, the cooler temperature of the chilling medium flow 300 dictates less pressure to liquefy the supercritical carbon dioxide flow 445 and, hence, overall less compression work. Less compression work thus results in less overall parasitic energy drain due to the carbon dioxide compressors 210.

As described above, the chilling medium flow 300 produced by the vapor absorption chiller 450 may be used for many other purposes in the overall integrated gasification combined cycle system 410 described herein. The chilling effect produced herein should improve overall system performance in that the chilling effect is provided without overall system parasitic power loses. Moreover, the systems described herein may be optimized for maximum recover of waste heat to enable further performance augmentation. Although integrated gasification combined cycle systems are described herein, the vapor absorption techniques described herein may be applicable to any type of power plant requiring compression of carbon dioxide and the like.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. An integrated gasification combined cycle system, comprising:
   a gas turbine engine;
   one or more power plant components;
   one or more carbon dioxide compressors; and
   a vapor absorption chiller;
   wherein the vapor absorption chiller is driven by a waste heat source flow from the one or more carbon dioxide compressors to produce a chilling medium flow to cool the one or more power plant components.

2. The integrated gasification combined cycle system of claim 1, wherein the one or more power plant components comprise one or more turbine inlet chillers.

3. The integrated gasification combined cycle system of claim 1, wherein the one or more power plant components comprise one or more compressor coolers.

4. The integrated gasification combined cycle system of claim 3, wherein the one or more compressor coolers comprise a pre-cooler, an inter-cooler, and an after-cooler.

5. The integrated gasification combined cycle system of claim 1, further comprising a compressor heat exchanger in communication with the one or more carbon dioxide compressors and the vapor absorption chiller.

6. The integrated gasification combined cycle system of claim 5, wherein the compressor heat exchanger and the vapor absorption chiller are in communication via a first fluid circuit.

7. The integrated gasification combined cycle system of claim 5, wherein the compressor heat exchanger and the one or more carbon dioxide compressors are in communication via a second fluid circuit.

8. The integrated gasification combined cycle system of claim 1, wherein the waste heat source flow comprises a flow of carbon dioxide.

9. The integrated gasification combined cycle system of claim 1, wherein the one or more carbon dioxide compressors comprise a low pressure compressor, an intermediate pressure compressor, and a high pressure compressor.

10. The integrated gasification combined cycle system of claim 1, wherein the vapor absorption chiller comprises a refrigerant therein.

11. The integrated gasification combined cycle system of claim 10, wherein the refrigerant comprises a flow of carbon dioxide.

12. The integrated gasification combined cycle system of claim 1, wherein the vapor absorption chiller comprises an absorbent therein.

13. The integrated gasification combined cycle system of claim of claim 12, wherein the absorbent comprises an alcohol or an ether.

14. A method of cooling a power plant component, comprising:
    generating a waste heat source flow in one or more carbon dioxide compressors;
    driving a vapor absorption chiller with the waste heat source flow;
    generating a chilling medium flow in the vapor absorption chiller; and
    cooling the power plant component with the chilling medium flow.

15. The method claim 14, further comprising the steps of:
    vaporizing a refrigerant in a generator of the vapor absorption chiller;
    liquefying the refrigerant in a condenser;
    expanding the refrigerant in an evaporator; and
    reabsorbing the refrigerant in an absorber.

16. An integrated gasification combined cycle system, comprising:
    one or more carbon dioxide compressors;
    one or more compressor coolers; and a vapor absorption chiller;
wherein the vapor absorption chiller is driven by a waste heat source flow from the one or more carbon dioxide compressors to produce a chilling medium flow to cool the one or more compressor coolers.

17. The integrated gasification combined cycle system of claim 16, wherein the waste heat source flow comprises a flow of carbon dioxide.

18. The integrated gasification combined cycle system of claim 16, wherein the one or more compressor coolers comprise a pre-cooler, an inter-cooler, and an after-cooler.

19. The integrated gasification combined cycle system of claim 16, wherein the one or more carbon dioxide compressors comprise a low pressure compressor, an intermediate pressure compressor, and a high pressure compressor.

20. The integrated gasification combined cycle system of claim 1, wherein the vapor absorption chiller comprises a refrigerant therein and wherein the refrigerant comprises a flow of carbon dioxide.

* * * * *